United States Patent [19]

Reznik

[11] Patent Number: 4,515,076

[45] Date of Patent: May 7, 1985

[54] APPARATUS FOR CRACKING AND SEPARATING NUTS

[76] Inventor: David Reznik, 375 Coleridge, Palo Alto, Calif. 94301

[21] Appl. No.: 506,682

[22] Filed: Jun. 22, 1983

[51] Int. Cl.³ .............................................. A23N 5/00
[52] U.S. Cl. ........................................ 99/571; 99/576
[58] Field of Search ................. 99/568, 571, 574–576, 99/580, 581, 600, 601, 609, 611, 617, 622; 426/482; 241/7, 8, 9

[56] References Cited

U.S. PATENT DOCUMENTS

| | | | |
|---|---|---|---|
| 1,342,690 | 6/1920 | Pape | 99/574 |
| 2,381,288 | 8/1945 | Jones | 99/571 |
| 2,512,107 | 6/1950 | Lenhart et al. | 99/571 |
| 3,354,923 | 11/1967 | Voller | 99/571 X |
| 3,401,730 | 9/1968 | Mathews et al. | 99/574 |

*Primary Examiner*—Timothy F. Simone

*Attorney, Agent, or Firm*—Edward B. Gregg; Willis E. Higgins

[57] ABSTRACT

A nutcracking apparatus (50) has a tube (56) dimensioned and configured to allow nuts to be propelled along the tube (56). An opening (58) spaced circumferentially around the tube (56) is angled to direct air along the propelled direction of the nuts. A blower (62) is connected to supply sufficient air to the openings (58) to create suction for pulling a nut into the tube (56) past the openings (58) and then to push the nut through the tube (56) after it has passed the openings (58). The nuts are propelled against a rotating impact roller (70), which cracks each nut and moves the cracked nut out of the path of the travel to prevent interference with a succeeding nut. Air from the tube (56) propels the nut shells through outlet (72) of chamber (68), while the nut meats are deposited on screen (74).

13 Claims, 6 Drawing Figures

APPARATUS FOR CRACKING AND SEPARATING NUTS

PRIORITY CLAIM

This application is based in part on Applicant's prior Israeli Patent Application Ser. No. 66,124, filed June 24, 1982. Pursuant to 35 USC 119 and 37 CFR, Section 1.55(b), the benefit of that filing date is asserted for subject matter common to that application and the present application.

BACKGROUND OF THE INVENTION

1. Field of the Invention

This invention relates to a method and apparatus for cracking nuts and for separating nut meats from the shells after the shells have been cracked. More particularly, it relates to such a method and apparatus which utilizes air to propel a nut for cracking and to separate the nut meats from the shells.

2. Description of the Prior Art

It is known to employ air under pressure in a pneumatic nut shelling apparatus, in which the nuts are projected down a tube through use of compressed air, against a cracking anvil. Such a method and apparatus is disclosed in, for example, U.S. Pat. No. 2,512,107. However, the method and apparatus there disclosed produces the nut meats and shells in admixture, and it is still necessary to provide additional apparatus for separating the resulting mixture. Also, since the method and apparatus there disclosed utilizes compressed air to propel the nuts down a tube, carrying out the method there disclosed is fairly costly.

It also is often necessary to recrack nuts processed through such prior art apparatus. This is done today with a different, mechanical cracking apparatus.

SUMMARY OF THE INVENTION

Accordingly, it is an object of this invention to provide a method and apparatus for cracking and separating nuts in which each nut is oriented to a preferred nut cracking orientation before it is cracked.

It is another object of the invention to provide an air driven nut cracking apparatus with an increased throughput rate.

It is a further object of the invention to provide an air driven nut cracking apparatus which does not require the use of compressed air.

It is still another object of the invention to provide an air driven nut cracking apparatus which will also separate nut meats from shells after the nuts have been cracked.

It is another object of the invention to provide a type of nutcracking apparatus that can also be used for recracking.

The attainment of these and related objects may be achieved through use of the novel air driven nut cracking apparatus herein disclosed. Apparatus for cracking nuts in accordance with this invention includes a means for accelerating nuts along a path of travel into engagement with an impact member. A means orients the nuts so that they will engage the impact member with a seam of their shell in a plane which is parallel to the impinging direction of the nut onto the impact member. In a preferred form of the invention, a means is provided for displacing the impact member transversely to the direction of impingement of the nuts against the impact member, so as to prevent interference between adjacent nuts in a successive stream impinging on the impact member.

Further, in a preferred embodiment of the invention, the means for accelerating the nuts includes a tube dimensioned and configured to allow nuts to be propelled along the tube. A plurality of openings or a single annular opening are spaced circumferentially around the tube and angled to direct air along the propelled direction of the nuts. A blower is connected to supply sufficient air to the plurality of openings to create suction for pulling a nut into the tube to the plurality of openings and for pushing the nut through the tube past the plurality of openings. In one form of the invention, the tube has a cross-section through which the nuts pass dimensioned to orient the nuts so that a seam joining halves of the nuts is parallel to the direction of travel of the nuts through the tube. The diameter of the tube is less than the length of the walnuts in one form of a tube to accomplish this function. For walnut halves, processed in a recracking operation, the tube should have an oval or a rectangular shape for orientation.

In order to utilize the air for both propelling the nuts and for separating the nut meats of the cracked nuts from the shells, the impact member is positioned in a chamber. The tube projects the nuts upward into the chamber against the impact member. The chamber has an outlet above the movable impact member. The air projecting the nuts through the tube moves through the chamber at a rate sufficient to remove nut shells through the outlet and insufficient to remove nut meats through the outlet.

Utilizing a blower to provide the air for propelling the nuts through the tube dramatically reduces equipment cost over the compressed air systems used in the prior art. Orienting the seam of the nut to be parallel to the direction of travel provides consistent cracking. Utilizing a chamber through which the nut propelling air passes to an outlet allows the air flow to be adjusted so that it will remove the shells from the chamber, but not the nut meats.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
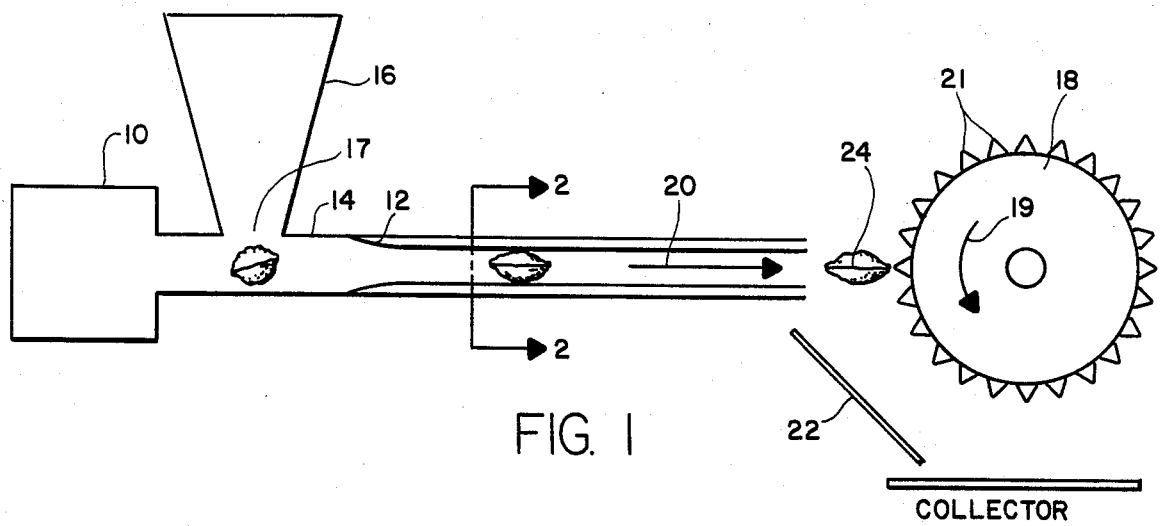
FIG. 1 is a schematic illustration of cracking and separating apparatus constructed and operative in accordance with a preferred embodiment of the invention.

Turning now to the drawings, more particularly to FIG. 1, there is shown an apparatus for cracking and separating nuts in accordance with the invention. The apparatus includes an accelerating means 10, which may either be a pneumatic tube connected to a source of compressed air, as is known in the art, or a tube connected to a blower, as in the embodiment of FIG. 3 to be discussed below. The accelerating means, for example, utilizes air to create a driving force for the nuts within the tube 14. Tube 14 may be either straight or curved. A reservoir 16 holds a supply of nuts to be cracked and is connected to the tube 14 by an input aperture 17.

Figure 2:
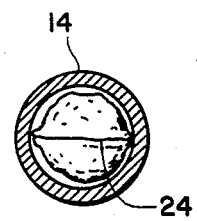
FIG. 2 is a cross-section view taken along the line 2—2 in FIG. 1.

In the form shown in FIGS. 1 and 2, the tube 14 has a reduced diameter dimensioned for providing desired orientation of the nuts passing through the tube. Portion 12 sloping to the reduced diameter orients the nuts as they pass through it. As a result, the nuts are oriented with seam 24 parallel to the direction of motion 20 of the nuts through the tube 14.

The tube 14 terminates adjacent to an impact roller 18. Roller 18 defines an impact surface onto which nuts impinge which have been accelerated by the accelerating means 10 and which have traveled through the tube 14. Impact roller 18 may be any element of suitable configuration and hardness to cause cracking, i.e., splitting of nuts impacted thereon with a predetermined amount of force. As shown, impact roller 18 moves transversely with respect to the direction 20 of travel of the nuts through tube 14, as indicated by arrow 19. This rotational movement of impact roller 18 may be continuous or stepwise, either during impingement of the nuts or between impingements.

Impact roller 18 has a plurality of pointed ribs 21 against which the nuts impact. The multiplicity of adjacent ribs 21 assists in cracking the nut, due to the concentration of force on a relatively small area. Any other suitable type of conditioned or smooth surface of any suitable material may be provided.

Disposed in a nut receiving orientation with respect to impact roller 18 is a rebound surface 22 which, depending on the forces involved, may serve either to collect split nuts or to define a second impact surface against which the nuts are impacted to provide enhanced separation and splitting action. Surface 22 may also serve to transfer the cracked nuts to collection or further processing stations.

In operation, movement of the impact roller 18 serves to prevent interference between nuts in a stream of nuts impinging on the impact roller 18.

Figure 3:
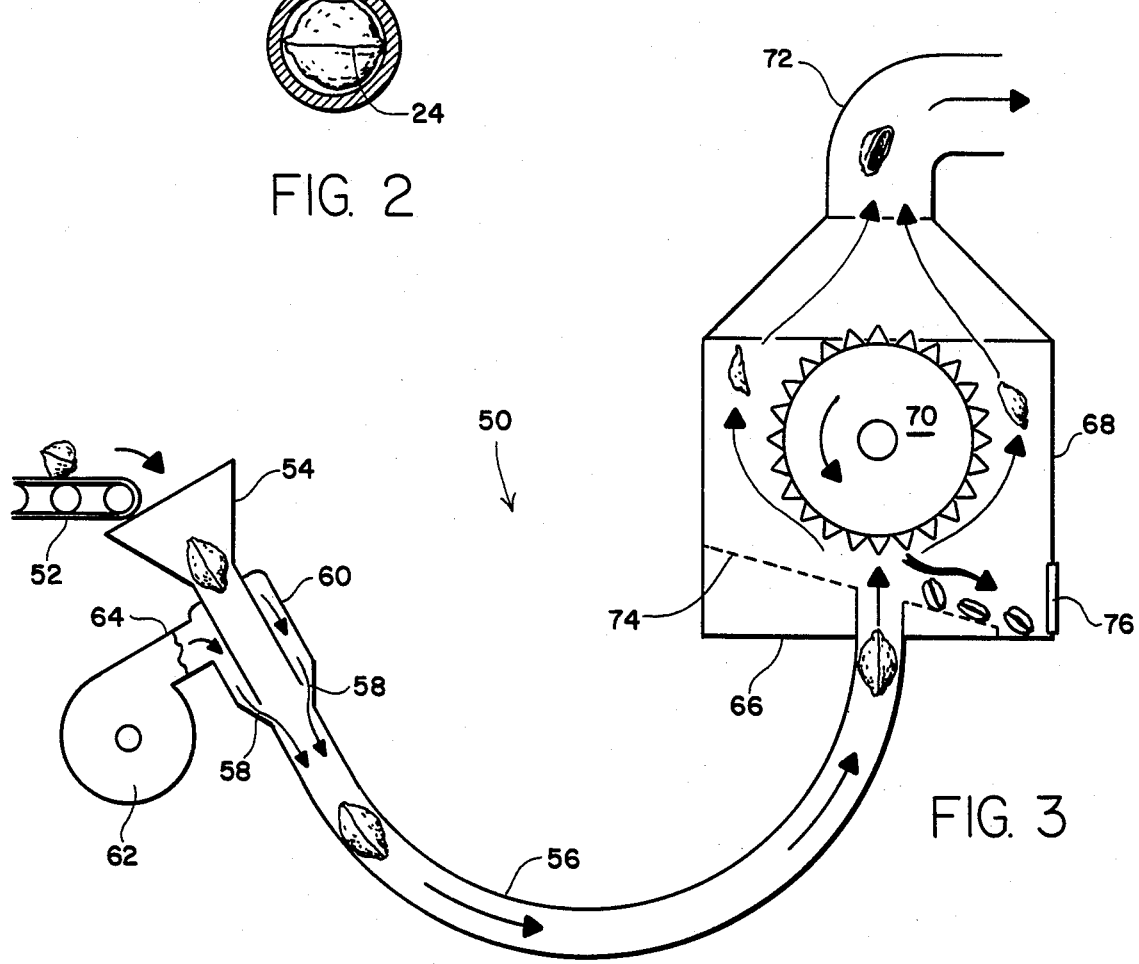
FIG. 3 is a schematic illustration of another embodiment of a cracking and separating apparatus constructed and operative in accordance with the invention.

FIG. 3 shows another embodiment of a nut cracking apparatus 50 in accordance with the invention. Nuts are delivered by an endless belt conveyor 52 to a funnel-shaped inlet to tube 56, which has a cross-sectional configuration as shown in FIG. 2. Tube 56 has an angled, annular air inlet aperture 58 circumferentially disposed around the tube 56 adjacent to, but separated from, the inlet 54. If desired, a plurality of separate apertures could be placed circumferentially around the tube 56 in place of the single, annular aperture 58. A manifold 60 extends around the tube 56, enclosing the angled aperture 58. An air blower 62 is connected to manifold 60 by air pipe 64. Tube 56 is connected to bottom 66 of chamber 68, so that the nuts are propelled vertically against roller 70. Outlet 72 at the top of chamber 68 allows air used to propel the nuts against the impact roller 70 to be removed from the chamber 68.

In operation of the FIG. 3 embodiment, air forced by blower 62 through angled openings 58 in tube 56 creates a suction at inlet 54 by the well known Venturi effect. This suction pulls nuts from the inlet 54 into the tube 56. When the nuts pass the angled apertures 58, the air serves to push them along the tube 56 into chamber 68 and against rotating anvil 70. The air is supplied to the chamber 68 at a rate which is sufficient to carry shells that have been separated by the impact against roller 70 through the outlet 72, but insufficient to so carry the heavier meats of the nuts. The nut meats drop to a screen 74, which is angled so that the nut meats will slide to the right of chamber 68 as shown. An access port 76 allows periodic removal of the separated nut meats.

In operation, the blower 62 creates only a few millimeters of pressure in the air supplied through angled apertures 58. In comparison, if compressed air is utilized to provide driving force to the nuts, a pressure of about 8 atmospheres is required to propel the nuts.

Figure 4:
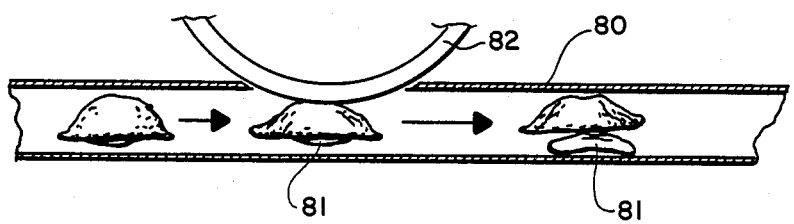
FIG. 4 is a side cross-section view of another embodiment of the invention.
Figure 5:
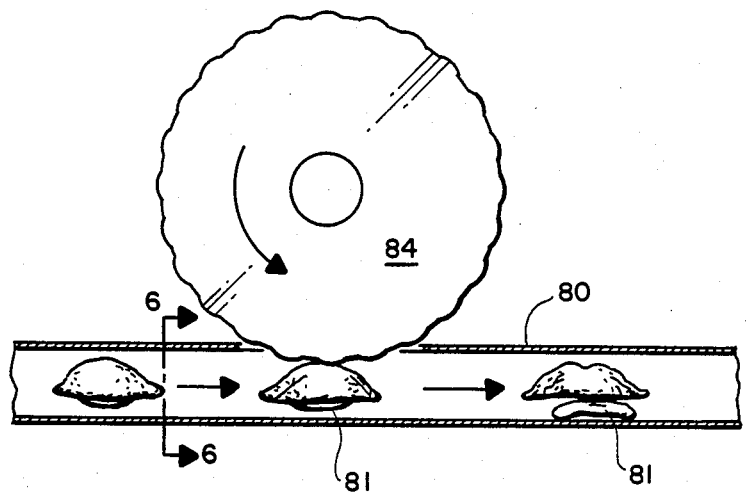
FIG. 5 is a similar view of still another embodiment of the invention.
Figure 6:
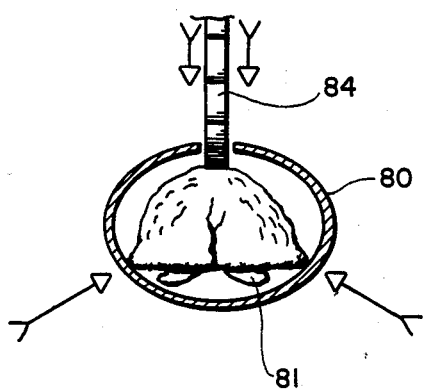
FIG. 6 is a cross-section view taken along the line 6—6 in FIG. 5.

FIGS. 4, 5 and 6 show alternative embodiments useful for recracking intact walnut halves, which typically result from about 30 percent of the nuts cracked with the FIGS. 1 to 3 embodiments. Tube 80 has an oval cross-section. The nuts are fed into the tube 80 with the exposed meat 81 down. Pressure is applied by either a weighted bow 82 (FIG. 4) or a rotating wheel 84 (FIG. 5). The shells 86 are clearly separated from the meat without damage to the meat 81 through the forces shown by the arrows 88 in FIG. 6.

In use of the invention, it is preferable to grade the walnuts by size and feed them to correspondingly different size tubes.

It should now be readily apparent to those skilled in the art that a novel method and apparatus capable of achieving the stated objects of the invention has been provided. The method and apparatus of this invention orients nuts and propels them through a tube for impact cracking. Air used to propel the nuts is also used to separate the shells from the nut meats. An increased throughput of cracked nuts is obtained by use of a movable input member. Because the apparatus of this invention need not employ compressed air for propelling the nuts, substantial savings in equipment cost are realized.

It should further be apparent to those skilled in the art that various changes in form and details of the invention as shown and described may be made. For example, anvils consisting of an annular ring with a diameter less than that of the nuts, which optionally may include a plurality of spring loaded hooks may be used to strip the shells from the nuts. It is intended that such changes be included within the spirit and scope of the claims appended hereto.

What is claimed is:

1. Apparatus for cracking walnut halves having an edge defining an open bottom, comprising a tube through which the walnut halves are propelled, said tube having a first cross-section dimension which will pass the halves in a desired orientation, and a second cross-section dimension orthogonal to and less than the first cross-section dimension, and means for applying sufficient force along the second cross-sectional dimension to crack the walnut halves, the desired orientation being such that the open bottom faces away from the force applying means and the first and second dimensions of said tube being such that the edges of the walnut halves rest on said tube during application of force by said force applying means.

2. The apparatus of claim 1 in which said tube has an oval cross-section.

3. The apparatus of claim 1 in which said force applying means is a rotating wheel extending into said tube.

4. A nutcracking apparatus, which comprises a tube dimensioned and configured to allow nuts having a seam joining halves of the nuts to be propelled along said tube, said tube having a diameter less than a length of the nuts, so that the nuts are oriented in said tube with the seam parallel to the direction of travel of the nuts through said tube, at least one opening positioned circumferentially around said tube and angled to direct air along the propelled direction of the nuts, and a blower connected to blow sufficient air through said at least one opening to create suction for pulling a nut into said tube to said at least one opening and pushing the nut through said tube past said at least one opening, said blower creating an air pressure on the order of a few millimeters in said tube.

5. Apparatus for cracking nuts in accordance with claim 4, additionally comprising an impact member.

6. Apparatus for cracking nuts according to claim 5 and wherein said impact member defines an impact surface and also comprising means for moving said impact surface transversely to the direction at which nuts impinge thereon so as to prevent interference between adjacent nuts in a stream of impinging nuts.

7. Apparatus according to claims 5 or 6 wherein said impact member comprises a roller with a cylindrical surface defining an impact surface and also comprising means for rotating said roller so as to cause said cylindrical surface to move transversely with respect to the direction of impingement of said nuts.

8. Apparatus according to claims 5 or 6 wherein said impact member has a ribbed impact surface to assist in cracking and separation of nuts impinging thereon.

9. Apparatus according to claims 5 or 6 further comprising a secondary impact member for engagement of nuts rebounding from engagement with said impact member for further enhanced cracking and separation.

10. The apparatus of claim 4 additionally comprising a movable impact member positioned to be struck by nuts propelled along said tube.

11. The apparatus of claim 10 in which said movable impact member is a roller.

12. The apparatus of claim 11 in which the roller is ribbed.

13. The apparatus of claim 12 in which said movable impact member is positioned in a chamber, said tube projects the nuts upward into said chamber against said movable impact member, said chamber has an outlet above said movable impact member and the air projecting the nuts through the tube moves through said chamber at a rate sufficient to remove nut shells through the outlet and insufficient to remove nut meats through the outlet.

* * * * *